US008824414B2

(12) United States Patent
Igo, Jr. et al.

(10) Patent No.: US 8,824,414 B2
(45) Date of Patent: Sep. 2, 2014

(54) TIME SLOT AND FREQUENCY ALLOCATION IN WIRELESS COMMUNICATION NETWORKS

(75) Inventors: Frederick J Igo, Jr., Ayer, MA (US); Ghulam M Bhatti, Mansfield, MA (US); Jianlin Guo, Newton, MA (US); Zafer Sahinoglu, Cambridge, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 88 days.

(21) Appl. No.: 13/418,494

(22) Filed: Mar. 13, 2012

(65) Prior Publication Data

US 2013/0242936 A1  Sep. 19, 2013

(51) Int. Cl.
*H04W 4/00*  (2009.01)
(52) U.S. Cl.
USPC .......................... 370/330; 370/436; 370/478
(58) Field of Classification Search
CPC ................................................ H04W 72/0453
See application file for complete search history.

(56) References Cited

U.S. PATENT DOCUMENTS

| 2006/0128402 | A1* | 6/2006 | Lee et al. | 455/464 |
| 2006/0245440 | A1* | 11/2006 | Mizukoshi | 370/400 |
| 2008/0159208 | A1* | 7/2008 | Kloker et al. | 370/329 |
| 2008/0260000 | A1* | 10/2008 | Periyalwar et al. | 375/133 |
| 2010/0296493 | A1* | 11/2010 | Lee et al. | 370/336 |
| 2011/0122967 | A1* | 5/2011 | Wiberg | 375/295 |
| 2011/0176534 | A1* | 7/2011 | Subramanian et al. | 370/350 |
| 2013/0051381 | A1* | 2/2013 | Bracha | 370/338 |
| 2013/0107869 | A1* | 5/2013 | Abraham et al. | 370/338 |

* cited by examiner

*Primary Examiner* — Xavier Szewai Wong
*Assistant Examiner* — M Mostazir Rahman
(74) *Attorney, Agent, or Firm* — Dirk Brinkman; Gene Vinokur (57) ABSTRACT

In a wireless network including a server and clients, network resources, such as time slots and channel frequencies, are managed by having the server define the resources for future use by the clients, while the clients actually allocate the resources for their exclusive use according to performance criteria determined by the clients. The network can be ad-hoc and in industrial environments with low-latency requirements.

15 Claims, 7 Drawing Sheets

TIME SLOT AND FREQUENCY ALLOCATION IN WIRELESS COMMUNICATION NETWORKS

FIELD OF THE INVENTION

This invention relates generally to wireless communications, and more particularly to channel access and scheduling of transmissions in an ad-hoc wireless network.

BACKGROUND OF THE INVENTION

Channel access and network resource management in a wireless network that allows both Carrier Sense Multiple Access with Collision Detection (CSMA/CD) and Time Division Multiple Access (TDMA) can use a Media Access Control (MAC) superframe.

The traffic in the TDMA part is due to the frames being transmitted by the nodes in allocated time slots. The network traffic in the CSMA part satisfies the need for asynchronous communications, which are generated by management frames, requests for time-slot allocation, transmission of data frames, and retransmissions of failed data frames.

The superframe specifies when a node is to receive and transmit data frames from and to other nodes. The superframe allocates resources so that nodes do not transmit concurrently if the nodes can interfere with each other on the same channel.

In an ad-hoc network, clients can join and leave the network at will, which makes network resource management difficult and time consuming. Many application in such a wireless network use a client-server model where there is a server node (server) and one or more client nodes (clients). The server defines the resources used by all clients in the superframe. The server periodically transmits information in a beacon frame (beacon). The beacon is used to synchronize network operations.

Then, the clients can receive downlink traffic data frames from the server, or transmit uplink traffic data frames to the server at specific times as defined in the beacon frame.

Depending on the type of wireless network, the server can allocate time slots to each client for its uplink and downlink traffic. In some cases, the server can specify a shared interval for uplink traffic from multiple clients. In this case, one or more clients may try to access a channel randomly, or by using a protocol such as CSMA/CD, etc., and start transmitting data frames. That can result in multiple clients transmitting the data frames on the same channel concurrently causing collisions, which amounts to a loss of data and a waste of bandwidth.

The client-server model can be used when multiple clients regularly communicate with the server. In the prior art, the server has complete control over the timing and frequency allocations using the beacon. The server allocates time and channel resources to the clients as needed.

Because the communications according to the client-server model are tightly coupled, one problem arises when one or more clients are out of sync with the server due to a loss of the beacon. That can happen, for example, when clients encounter severe and persistent interference that makes it impossible to receive the beacon.

One way to deal with the interference problem is to use frequency hopping where the server and the clients periodically use channels with different frequencies. While it is useful to change the channel when some of the clients experience excessive interference, it is quite possible that the new channel also experiences interference.

Another problem that needs to be addressed is to preserve synchronization between the server and clients across different channels. In the prior art, the server uses a pre-defined hopping sequence of channels at regular intervals.

The client that loses the link with server can switch to the next channel in the sequence, and wait for the next beacon. After the client receives the beacon, the client synchronizes to the server.

If the client fails to receive the beacon for any reason, the client can lose communications with the server for an extended time period. This can happen in many time-critical applications, such as factory automation, commercial building controls, etc., where extended delays in communications are unacceptable. To make the matters worse, industrial environments inside buildings are less suited for wireless communications.

In the conventional TDMA based hopping, such as in Dust Nets, the server has complete control over the hopping sequence and the clients must follow the same sequence in order to communicate with the server. In other cases, for example the frequency agility mechanism in ZigBee, the personal area network (PAN) coordinator can move to another channel after the current channel becomes noisy, and all other nodes must follow it.

Therefore, it is desired to improve time slot and channel allocations in wireless networks.

SUMMARY OF THE INVENTION

The embodiments of the invention provide a method for multiple-access control (MAC) and carrier (frequency band) allocation of channels and transmission time shared between a server and a set of clients. The invention describes a channel hopping method for reliable communications between the server and the clients.

In contrast with the prior art, where the server exclusively controls the time slot and channel assignment sequence and all the clients follow that sequence, the embodiments enable the clients to select optimal sequences selected by the clients.

Furthermore, the client can remain on a channel, without hopping, until successful or the channel is unusable due to interference, shadowing, or any other reason. Then, the client selects another channel based on previous communications with the server, and hops to the selected channel. The client can continue to hop until a satisfactory channel is selected.

In other words, the server only defines the time slots and frequency channels that the clients can use. However, the clients have total autonomy to select and allocate the slots and frequencies that are best suited for their purposes, all within a current superframe. The clients can select and allocate backup time slots and frequencies, or spare time slots unknown to the server, until the allocation of these resources are signaled to the server.

In the prior art, the clients have to get direction or agreement from the server before moving to different channels. Alternatively, the clients have to completely disconnect from the network, and rejoin the network to get new time slot and channel allocations. This is unacceptable for applications where unnecessary delays cannot be tolerated.

The invention is based on the realization that only the clients can truly evaluate the condition of the channel. Because there might not be sufficient time to restart the server-client synchronization every time communications are lost, because low-latency is an application requirement, the invention enables the clients to autonomously and quickly change channels.

DETAILED DESCRIPTION OF THE PREFERRED EMBODIMENTS

Figure 1:
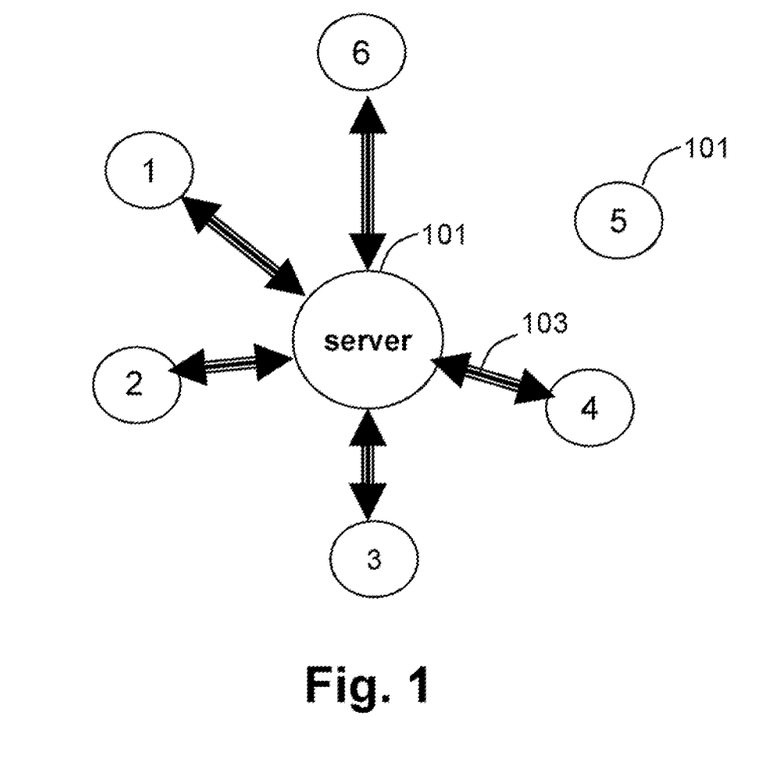
FIG. 1 is a schematic of a wireless network that uses embodiments of the invention.

FIG. 1 shows a wireless network where a server 101 periodically communicates with six clients (1-6) 101 using a set of frequency channels (FC) and a superframe. The FC can change over time due the dynamically changing topology of the network and channel conditions.

The embodiments of the invention provide a method for allocating time slots and channel frequencies to accommodate the dynamics of the network. In part, the embodiments enable the clients to make time slot and frequency allocations, and not the server exclusively as in the prior art.

As defined herein, the server defines network resources that can be allocated by the clients. The resources include times and frequencies. The resources can be shared by all clients, are dedicated for specific clients. However, it is only the clients that allocate these resources. As used herein, an allocation is an express commitment by a client to exclusive use a particular resource. The network synchronization, and the defining and allocating as described herein, are performed according a beacon in a superframe.

In addition, the clients can allocate resources dynamically. This would be case where the clients need to transmit additional data, and the resources defined by the server are insufficient to transmit the additional data. In this case, the clients allocate resources that have not necessarily been defined by the server.

A modified beacon frame is described herein.

Figure 2:
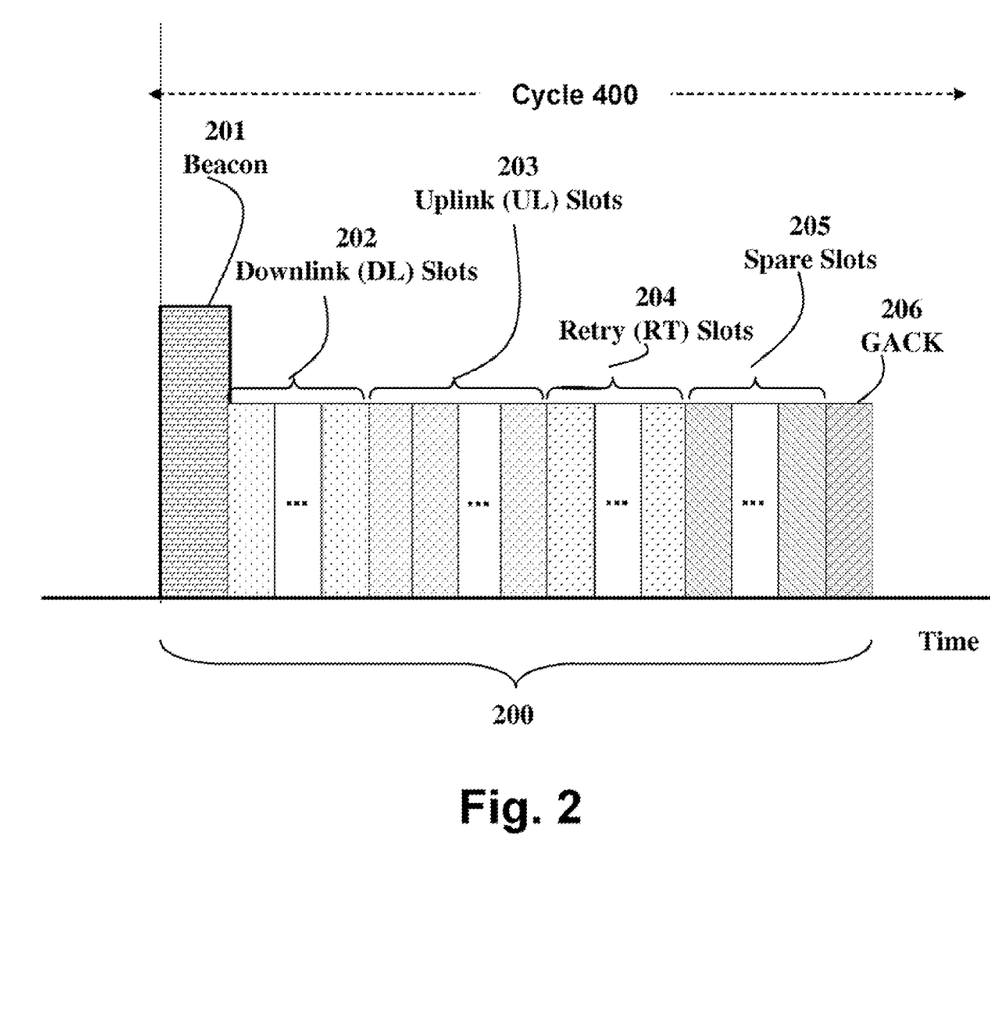
FIG. 2 is a block diagram of a superframe used by the networks of FIG. 1.

FIG. 2 shows a structure of a superframe 200 according to the embodiments of the invention. During each cycle 400, the server transmits the superframe at least once on every channel. The cycle is usually much longer than the duration of the superframe. The superframe defines a beacon frame (beacon) 201, a number of time slots allocated for downlink (DL) 202 and uplink (UL) 203 traffic, a list of retry time slots 204, spare time slots 205, and a group ACK (or GACK) frame 206.

Figure 3:
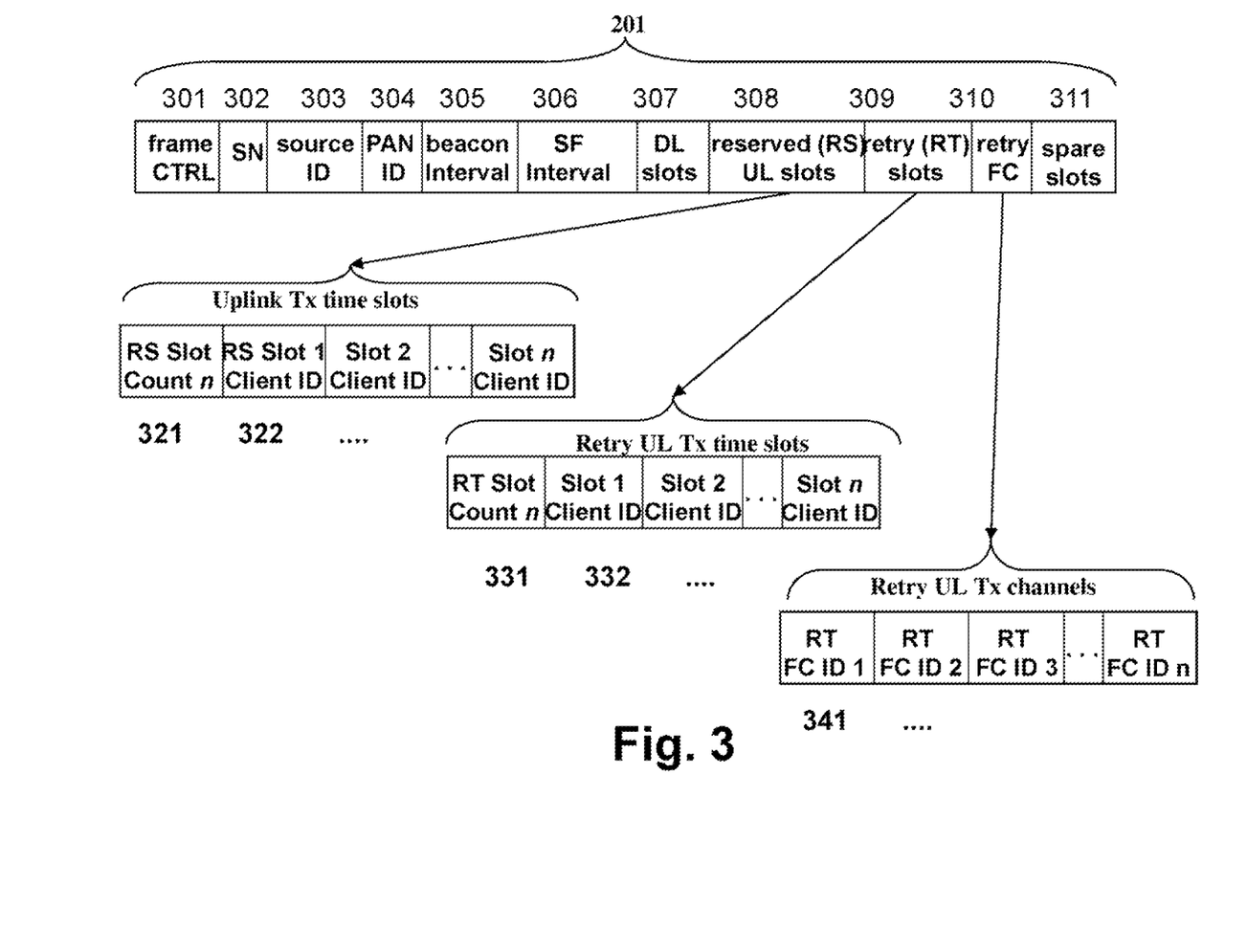
FIG. 3 is a block diagram of beacon frame in the superframe of FIG. 2.

FIG. 3 shows the beacon according to the embodiments of the invention. The beacon defines fields 301-311, respectively, including frame control (CTRL), sequence number (SN), source identification (ID), personal area (PAN) network ID, beacon interval, superframe (SF) interval, the number of DL slots, reserved. UL slots, RT (backup) slots, retry FC, and spare slots.

The reserved (RS) UL transmission (Tx) time slots 309 include a slot count 321 and client IDs 322. The retry (RT) Tx time slots include a retry slot count and client IDs 332. The retry FC include the client IDs 341. The server can define several sets of same size time slot in the superframe for the clients that are operating on a particular channel, e.g., when data traffic is known to be large.

The first set $S_{dl}$ of zero or more DL time slots 307 in the superframe is defined for the downlink communications. The server transmits (unicast, multicast, or broadcast) the data frames during the DL time slots.

A set $S_{ul}$ of zero or more reserved UL time slots 308 is defined to the clients for transmitting the data frames to the server.

The superframe can have a set $S_{rt}$ of retry UL slots 309, which can be allocated by clients that were unsuccessful in their UL transmissions, while previously operating on a different frequency channel, and now are allocable for retransmissions.

A list $L_{bc}$ of (0 to $S_{ul}$ or $S_{rt}$) RT channels 310 is defined for the clients for re-transmission when the UL communications fail during this superframe. The server defines these channels based on a procedure, or communication history between the server and the clients. However, it is the clients that make the actual allocations.

Any client that fails in its UL transmission during its allocated time slot in the current superframe can hop to a channel specified in the list 310, and then wait for the next beacon.

The server can also define a set $S_{xt}$ of spare time slots 311. These slots are used for asynchronous uplink communications when a new client joins the network and wants to transmit its first uplink frame to the server. After the server successfully receives that first frame, the server can define additional UL time slots for that client beginning with the next superframe. The spare slot can also be allocated by a client that has hopped to another frequency channel for a retry, and wants the server obtain this other channel.

During operation, the server and the clients work in a cooperative manner. The server has knowledge of which client was operating on which channel in previous cycle(s). The server defines time slots to each client accordingly. The server also defines backup time slots on a different frequency channel in case the client cannot (or does not want) to transmit using the channel/slot defined by the server. The client can also decide to ignore the backup channel/slot, and try to use yet another channel or time slot. Therefore, the server monitors all defined channels during the defined timeslots to ensure that the server communicates with each client during each cycle.

The GACK frame 206 is transmitted by the server at the end of the superframe. The GACK frame acknowledges the uplink transmissions successfully received by the server during this superframe. The GACK frame contains a bitmap with each bit corresponding to one UL time slot. The bit indicates success or failure.

Each client initially waits for the beacon on the channel allocated by the server. After the client receives the beacon, the client synchronizes to the server, and receives, if any, DL transmission from the server in the time slot specified in the beacon.

The client can also determine the time slot allocated for its uplink transmission. Each client transmits the data frame in the assigned time slot. It is possible for a client to allocate multiple time slots if more data are to be communicated, e.g., when the client has a large amount of data to communicate.

After transmitting the data frame, the client waits for the GACK frame. This frame indicates if the server successfully received the uplink data frame from the client in the allocated UL time slot(s).

If the client fails to transmit the data frame, as indicated from the received GACK frame, the client can take one of the following two options.

In a first option, if there is no retry (backup) channel specified for the client in the list $L_{bc}$ 310, then the client waits to retransmit on the same channel.

Because the duration of the cycle is much larger than the superframe, the server can monitor all channels in the FCS to receive data from "failed" clients. In this case, the server only attempts to communicate with the clients that previously failed in their uplink transmissions.

Figure 4:
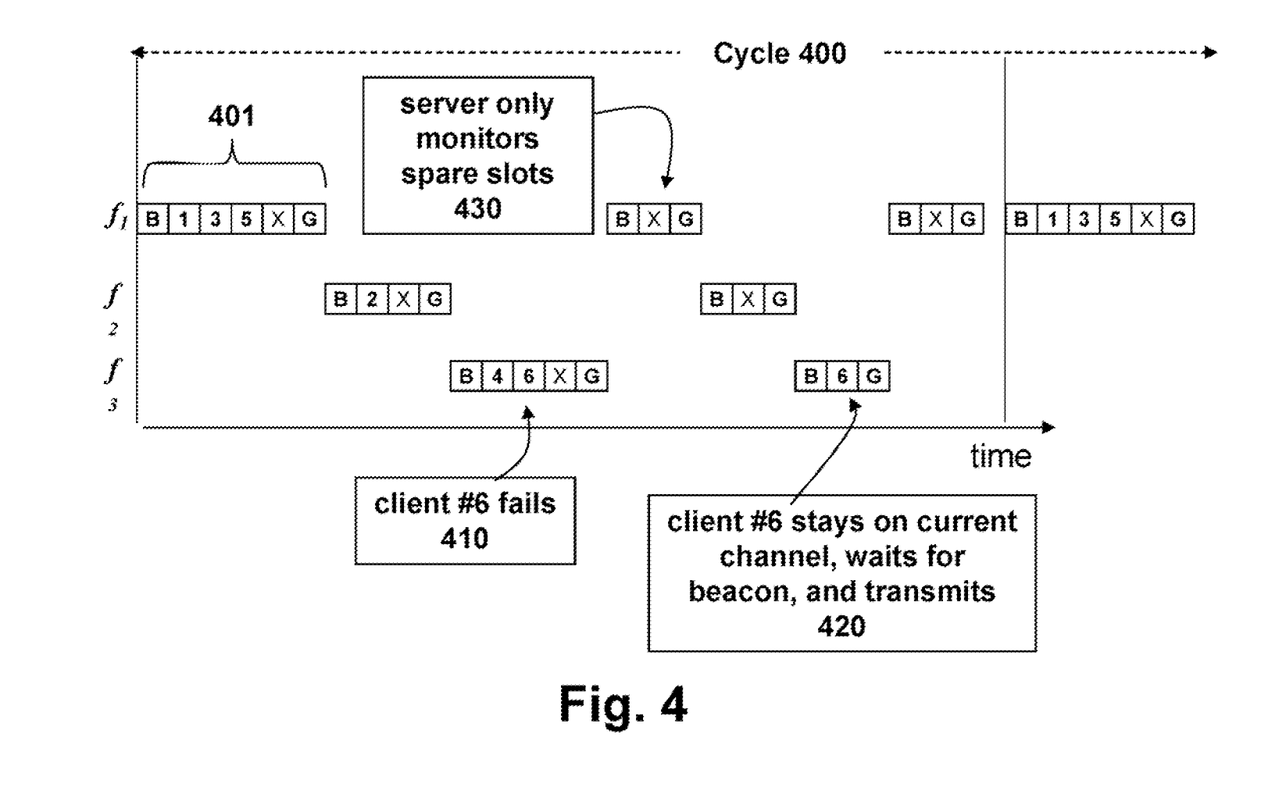
FIG. 4 is a schematic of a cycle where a server monitors all allocated frequency channels.

FIG. 4 shows an example of a failure during a cycle 400. In the superframes 401, B and G indicate the beacon and GACK. Clients #1, #3, and #5 use FC $f_1$, client #2, uses $f_2$, and clients #4 and #6 use FC $f_3$.

After receiving the GACK frame, the client #6 determines that it failed 410. The client #4 successfully transmitted its data frame.

If there is no backup channel allocated in the superframe for client #6, as determined by the beacon frame, the client #6 can stay on the same channel $f_3$ and wait 420 until the server hops back to that channel, and transmits the next superframe and beacon. Then, the client #6 can retransmit the data frame.

FIG. 4 also shows the server monitoring 430 only the spare time slots.

Figure 5:
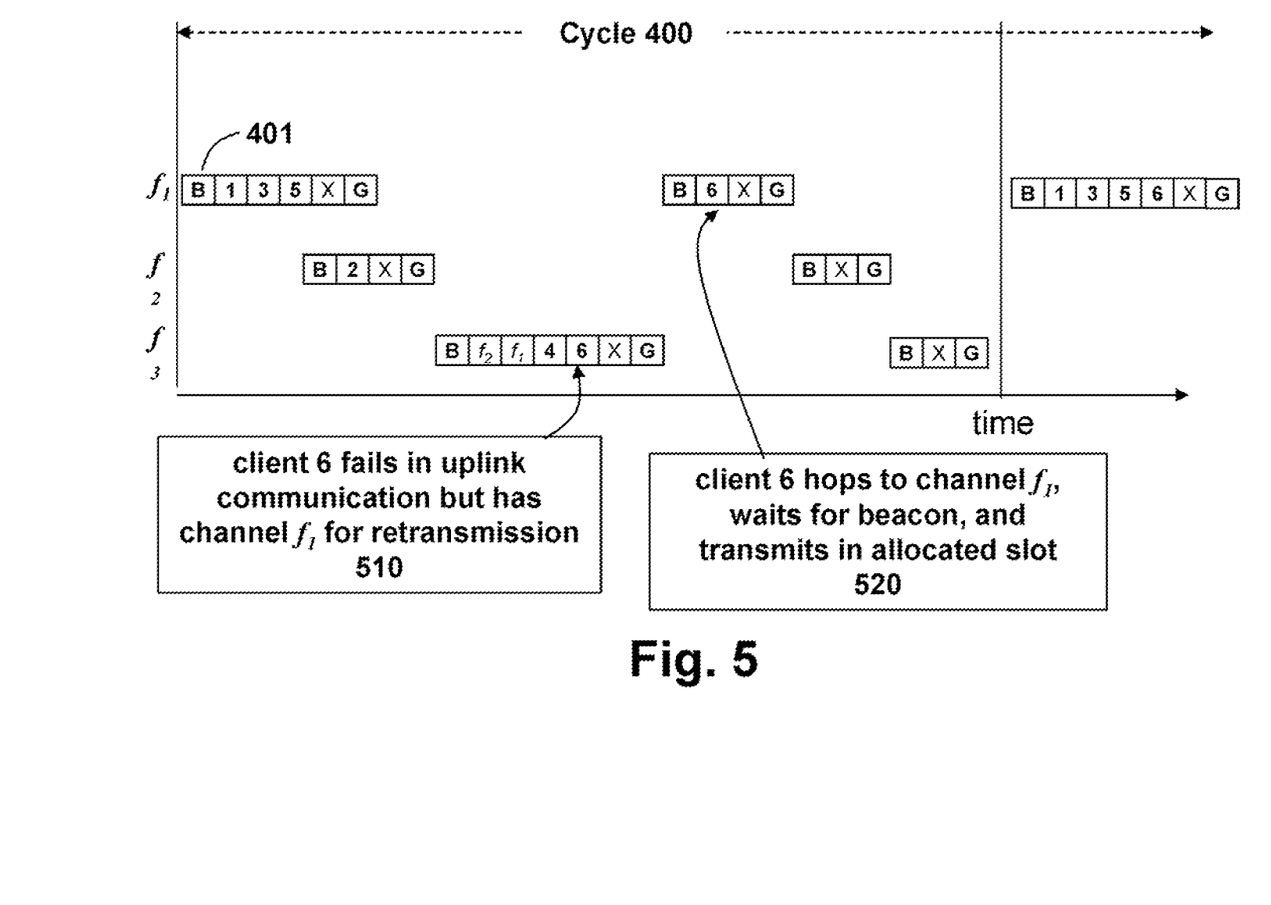
FIG. 5 is a schematic of a cycle where a client hops to another channel after a failure during an uplink transmission.

FIG. 5 shows an example where Client #6 fails 510, and then hops to FC $f_1$. After receiving the beacon frame on channel $f_1$, the client uses the uplink slot defined in that superframe. If the UL transmission on channel $f_1$ is successful, then the server allocates future time slots to that client on channel $f_1$. The server can also allocate another backup (retry) channel for the client in the superframe. Then, the client has the option to hop to another channel.

The server maintains a history of channels usage for each client. The history is used by the server for defining backup channels for the clients. If no history exists for a particular client, the server can use a resource allocation procedure to select appropriate backup channels.

After receiving the beacon, the client can determine the number and timing of spare time slots in the superframe. Then, the client selects a spare slot and retransmits the data frame during that spare time slot, and waits for the GACK frame to determine if the uplink transmission succeeded, or not. Then, the server updates for the channel selected by the client, and the history. The client can keep continue to change the channel until an optimal performance is achieved as determined by the client.

The client can decide to abandon the channel defined by the server after a pre-defined number of failures on that channel. In such a case, the client hops to another channel in the FCS, and then waits for the beacon.

Figure 6:
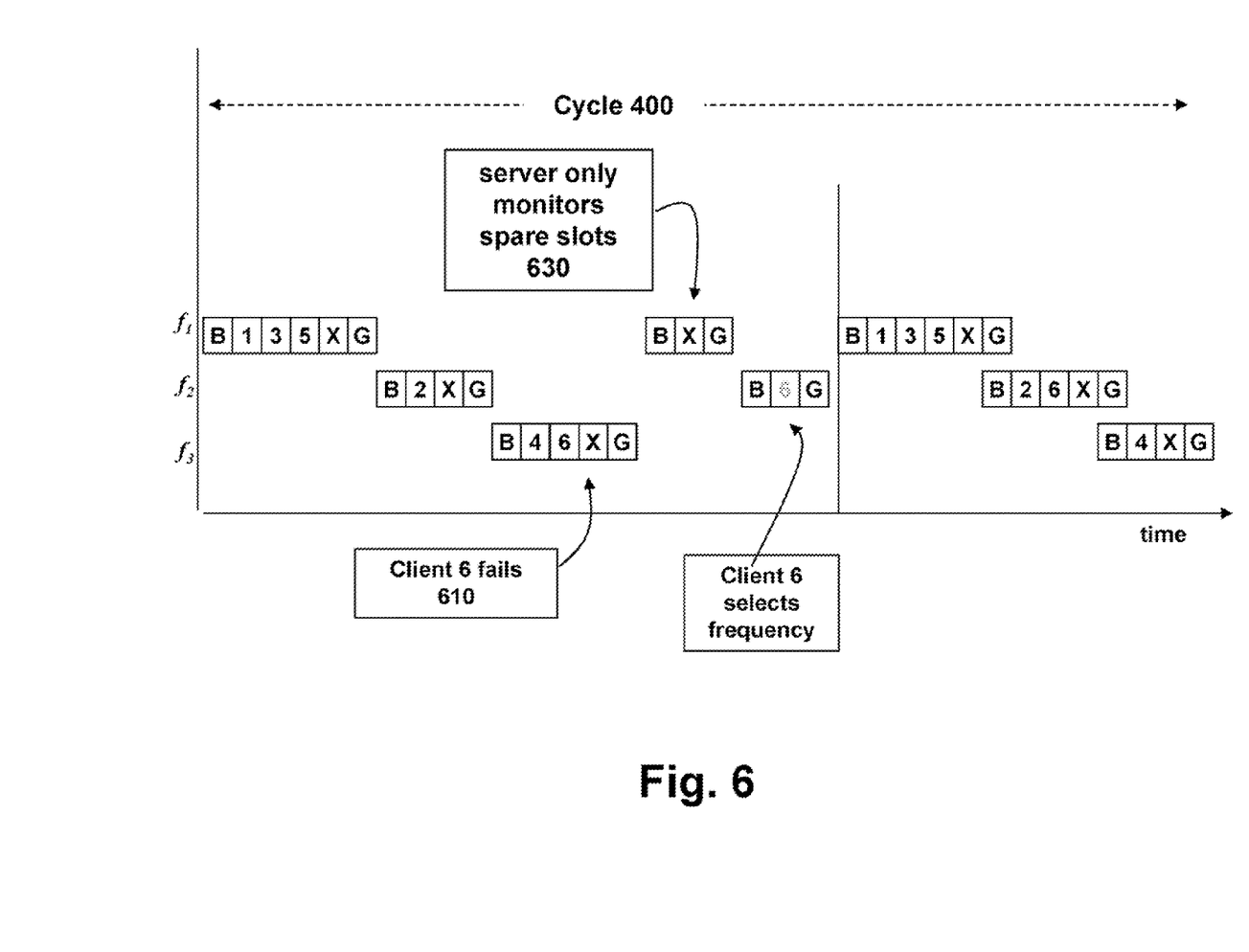
FIG. 6 is a schematic of a cycle where a client fails and hops to another channel.

FIG. 6 shows an example where client #6 fails 610, and selects another frequency 620, while the server only monitors 630 the spare time slots. In this case, the server monitors all channels until all the clients have been serviced. Then, the server continues monitoring only the spare slots, and the client selects the frequency channel and allocates a spare slot for its own use.

Figure 7:
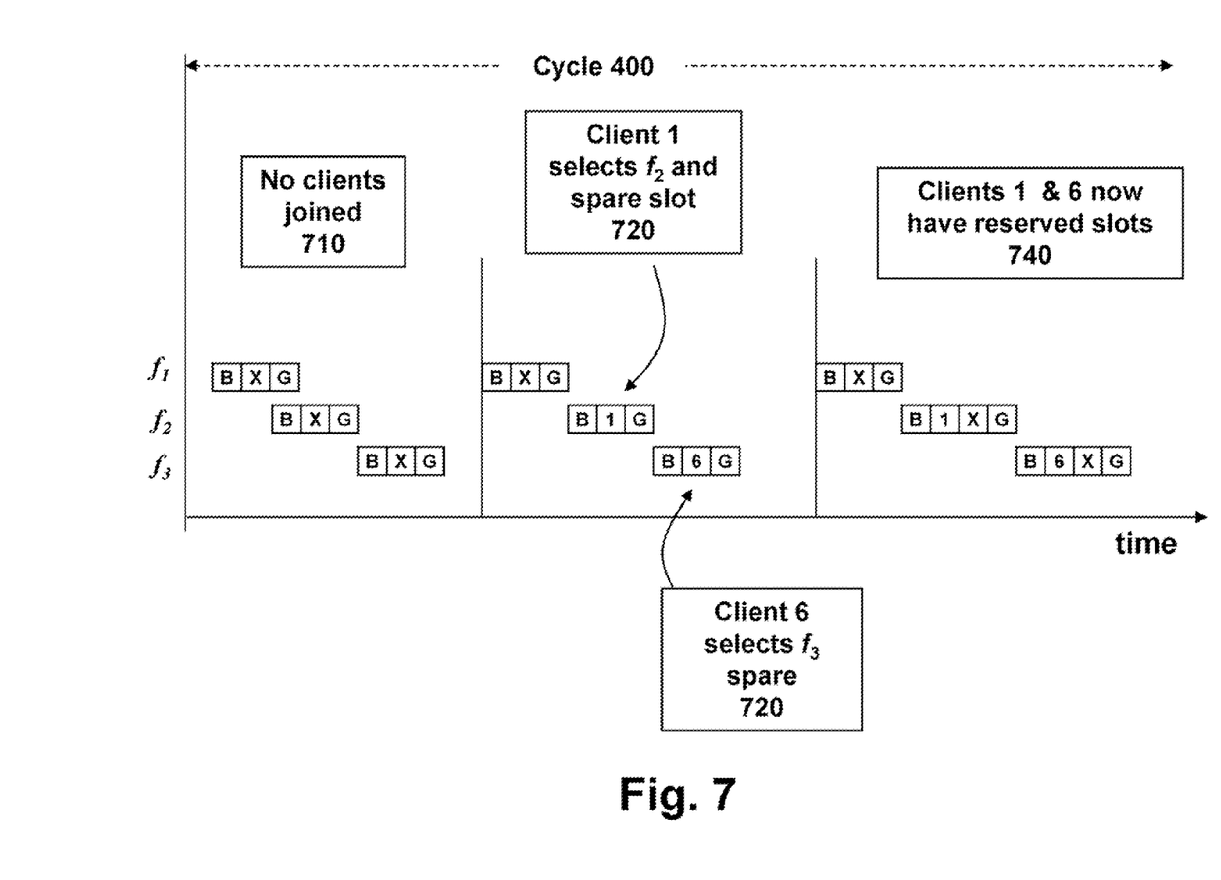
FIG. 7 is a schematic of a cycle where clients select other frequencies and time slots.

FIG. 7 shows an example for a joining process for new clients. In this embodiment, the server does not have a process to facilitate the joining by new clients to the network. Initially, there are no clients 710, no reserved slots, and only spare slots.

New client #4 and #6, after receiving the beacon, select 720 FC ($f_2$) and ($f_3$) and spare time slots. If the clients are successful, the clients now have 740 reserved slots and FCs. Otherwise, the client can wait multiple (3) cycles to determine if the server is not on the FC, or there is too much interference, and then selects another FC. The next FC is selected to avoid collisions.

There can be a problem when multiple clients lose contact with the server and two or more clients try to select the same FC, and there is only one spare slot on that FC. In this case, collisions can occur, and none of the clients succeeds to migrate to the new FC.

To solve this problem, the server indicates in the beacon which alternate FC the server will monitor for failed clients on this FC, and the server defines a sufficient number of slots depending on the number of clients that failed.

Each client can be assigned a spare slot for one alternate FC. The server selects the alternate FC on a client-by-client basis, based on the historical error record per frequency for each client. The client has the option to ignore the retry slot FC, and instead move to a spare slot and another FC.

EFFECT OF THE INVENTION

The invention enables clients to autonomously select time slots and channels, i.e., network resources.

A client can remain on a channel, without hopping, until successful or the channel is unusable due to interference, shadowing, or any other reason. In the latter case, the client can selects another channel based on previous communications with the server, and hops to the selected channel. The client can continue to hop until a satisfactory channel is selected.

The server only defines the time slots and frequency channels that the server can use. However, it is the clients that select the slots and frequencies that are best suited for their purposes, all within a current superframe.

This enables the client to operate in low-latency applications wireless application, particularly in industrial environments, where interference is a problem. For example, latencies on the order of milliseconds or less.

The invention enables the clients to evaluate channel conditions, and change to different channels without delay.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for managing resources in a wireless network including a server and clients, comprising the steps of:
    defining, by the server, the resources in a beacon of a superframe, wherein the resources are time slots and frequency channels;
    allocating, by the clients, the resources, and wherein the time slots include backup time slots, and the server defines the backup, time slots on different frequency channels; and
    monitoring, by the server, during each cycle, each resource defined by the server to ensure that the server communicates with each client during each cycle.

2. The method of claim 1, wherein the wireless network is an ad-hoc wireless network.

3. The method of claim 1, wherein the clients allocate resource dynamically.

4. The method of claim 1, wherein the clients follow an optimal frequency hopping sequence selected by the clients.

5. The method of claim 1, wherein the clients remains on a channel, without hopping, until successful, and further comprising:
    selecting, by the clients, another channels if unsuccessful.

6. The method of claim 1, wherein the clients have total autonomy to select and allocate the time slots and the frequency channels within a current superframe.

7. The method of claim 1, wherein the clients select and allocate backup time slots and frequencies.

8. The method of claim 1, wherein the clients select spare time slots unknown to the server until the clients allocate the spare time slots.

9. The method of claim 1, wherein the resources are defined to be shared by the clients.

10. The method of claim 1, wherein the resources are defined to be dedicated for specific clients.

11. The method of claim 1, further comprising:
   transmitting, by the server, the superframe at least once on every channel during a cycle, wherein a duration of the cycle is longer than the duration of the superframe.

12. The method of claim 1, wherein the defining is according to a communication history between the server and the clients.

13. The method of claim 1, wherein the clients allocates multiple time slots.

14. The method of claim 1, wherein the clients continue to change the frequency channels until an optimal performance is achieved as determined by the clients.

15. The method of claim 1, wherein a particular client abandons the frequency channels after a pre-defined number of failures on that channel and hops to another frequency channels.

\* \* \* \* \*